(No Model.)
J. UNDERWOOD.
HARROW.
No. 354,497. Patented Dec. 14, 1886.
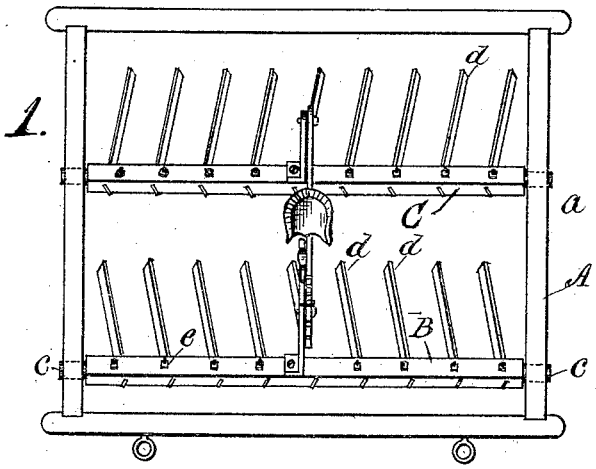
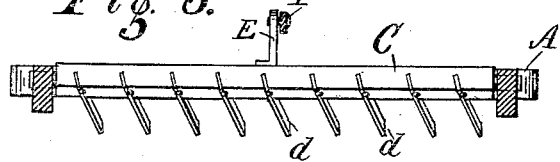
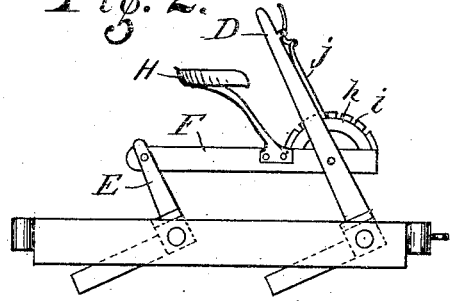
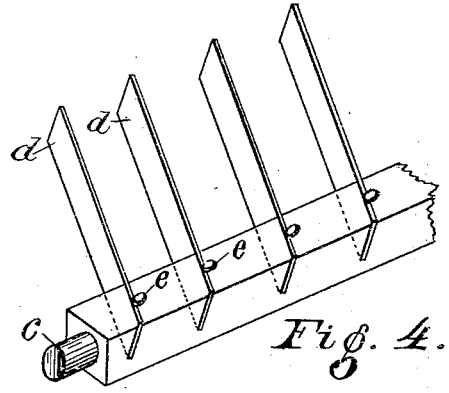
Witnesses
A. M. Hood.
V. M. Hood.
Inventor
John Underwood
By His Attorney
H. P. Hood

UNITED STATES PATENT OFFICE.

JOHN UNDERWOOD, OF SHERIDAN, INDIANA.

HARROW.

SPECIFICATION forming part of Letters Patent No. 354,497, dated December 14, 1886.

Application filed September 13, 1886. Serial No. 213,393. (No model.)

*To all whom it may concern:*

Be it known that I, JOHN UNDERWOOD, a citizen of the United States, residing at Sheridan, in the county of Hamilton and State of Indiana, have invented a new and useful Improvement in Harrows, of which the following is a specification.

My invention relates to an improvement in that class of harrows in which the harrow-teeth consist of thin steel blades adapted to cut and turn the earth.

The object of my improvement is to arrange one or more series of straight flat blades so that side draft on the harrow may be avoided and the earth raised and turned as the harrow moves forward, the said blades being so mounted in the harrow-frame that they may be quickly adjusted to cut to a greater or less depth, at the will of the operator, all as hereinafter fully described.

The accompanying drawings illustrate my invention.

Figure 1 is a plan. Fig. 2 is a side elevation. Fig. 3 is a transverse section at $a$, Fig. 1. Fig. 4 is a perspective view, on an enlarged scale, of a portion of the under side of the harrow, showing the position of the cutters in the rock-shaft and the manner in which they are secured thereto.

The harrow, as shown, consists of a rectangular frame, A, in which are mounted transversely two rectangular rock-shafts, B and C, which are provided with journals $c$ at each end, which rest in bearings formed in the sides of the frame A. Each of said rock-shafts is provided with a series of blades, $d\ d$, which extend backward and downward from the rock-shafts. For the purpose of turning the rock-shafts in their bearings, and thereby adjusting the free ends of the blades $d$ to project a greater or less depth below the lower edge of the frame A, I secure rigidly to the upper side of the rock-shaft B a long lever, D, and to the upper side of the rock-shaft C, I secure a short lever, E, which levers are connected by means of a bar, F, which is pivoted at opposite ends to the respective levers.

Lever D is adjustably secured at different angles with bar F by means of a segment-bar, $h$, having a series of notches, $i$, which are engaged by a sliding pawl, $j$, mounted on the lever. A seat, H, may be mounted on bar F. Each of the blades $d$ consists of a straight, thin, and narrow plate of steel. Said plates are set in grooves which pass diagonally across the under face of the rock-shaft, and are also inclined vertically thereto, as clearly shown in Fig. 4. The effect of this arrangement is to cause the blades in rock-shaft B, when lying in the same plane as the frame, to extend backward from the rock-shaft in such a position that a longitudinal section through the blade is inclined horizontally toward one side of the frame at an acute angle, while a transverse section through the blade is inclined vertically toward the opposite side of the frame at an acute angle to the perpendicular.

The blades in rock-shaft C are inclined oppositely to those in rock-shaft B. The blades are secured in their respective grooves by bolts $e$, the heads of which engage the lower edges of the blades. In operation lever D is drawn toward the seat, thereby throwing the back ends of both series of blades $d$ below the lower edge of the frame. It will be observed that in this position of the blades transverse sections of the blades will approach a horizontal position, so that while the inclination of longitudinal sections of the blades will tend to cause the harrow to run to one side, the opposite inclination of the transverse sections will tend to cause it to run to the opposite side, and it therefore moves straight forward without side draft, the earth being raised and turned and thoroughly pulverized as the blades move through it. By this construction the necessity heretofore existing for twisting and curving the blades to a given pattern is avoided, and any blade may therefore, when broken, be cheaply replaced.

I claim as my invention—

1. In a harrow, the combination of the main frame, the rock-shaft mounted in said frame, a series of straight flat blades secured to said rock-shaft and projecting therefrom and inclined horizontally and vertically in relation thereto, substantially as specified, and means for adjustably securing said rock-shaft in position.

2. In a harrow, the combination of the main frame, two rock-shafts mounted in said frame, means, substantially as shown and described, for securing the rock-shaft in different positions, and two series of straight flat blades secured to said rock-shafts and projecting therefrom, said blades being inclined horizontally and vertically in relation to their respective rock-shafts, and oppositely inclined in the two series, substantially as specified.

JOHN UNDERWOOD.

Witnesses:
A. PURSEL,
W. C. FURNAS.